US012420547B2

(12) United States Patent
Shiozawa et al.

(10) Patent No.: US 12,420,547 B2
(45) Date of Patent: Sep. 23, 2025

(54) LIQUID EJECTING HEAD AND LIQUID EJECTING APPARATUS

(71) Applicant: SEIKO EPSON CORPORATION, Tokyo (JP)

(72) Inventors: Yu Shiozawa, Shiojiri (JP); Hitoshi Takaai, Azumino (JP); Motoki Takabe, Shiojiri (JP); Eiju Hirai, Azumino (JP); Takahiro Kanegae, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 170 days.

(21) Appl. No.: 18/457,627

(22) Filed: Aug. 29, 2023

(65) Prior Publication Data

US 2024/0066861 A1 Feb. 29, 2024

(30) Foreign Application Priority Data

Aug. 30, 2022 (JP) ................................ 2022-136573

(51) Int. Cl.
*B41J 2/045* (2006.01)
*B41J 2/14* (2006.01)

(52) U.S. Cl.
CPC ....... *B41J 2/04581* (2013.01); *B41J 2/14233* (2013.01); *B41J 2002/14306* (2013.01)

(58) Field of Classification Search
CPC ................ B41J 2/04581; B41J 2/14233; B41J 2002/14306; B41J 2202/12; B41J 2002/14241; B41J 2002/14419; B41J 2/14201; B41J 2/01
See application file for complete search history.

(56) References Cited

U.S. PATENT DOCUMENTS

2018/0264830 A1 9/2018 Tomimatsu
2021/0008882 A1* 1/2021 Takabe ................ B41J 2/14233

FOREIGN PATENT DOCUMENTS

JP 2018-153926 A 10/2018

* cited by examiner

*Primary Examiner* — Lisa Solomon
(74) *Attorney, Agent, or Firm* — Harness, Dickey & Pierce, P.L.C.

(57) ABSTRACT a first compliance portion provided at a position on the first side of a coupling area in the common flow path where the common flow path is coupled to the plurality of individual flow paths; and a second compliance portion, different from the first compliance portion, provided at a position on a second side of the coupling area in the common flow path, the second side being the other side in the second direction and being opposite to the first side, and the first compliance portion and the second compliance portion have an overlapping portion where the first compliance portion and the second compliance portion partially overlap each other as viewed in the second direction.

20 Claims, 8 Drawing Sheets

LIQUID EJECTING HEAD AND LIQUID EJECTING APPARATUS

The present application is based on, and claims priority from JP Application Serial Number 2022-136573, filed Aug. 30, 2022, the disclosure of which is hereby incorporated by reference herein in its entirety.

BACKGROUND

1. Technical Field

The present disclosure relates to a liquid ejecting head and a liquid ejecting apparatus.

2. Related Art

Regarding a liquid ejecting head included in a liquid ejecting apparatus such as a printer, JP-A-2018-153926 discloses a liquid ejecting head including compliance substrates. In the liquid ejecting head, the compliance substrates absorb a fluctuation in the pressure of liquid, increasing the stability of liquid ejection from the liquid ejecting head. In the liquid ejecting head disclosed in JP-A-2018-153926, the compliance substrates are located at lower portions of the common flow path coupled to the pressure chambers.

However, the compliance substrates are away from the pressure chambers in the liquid ejecting head disclosed in JP-A-2018-153926, and hence, it is possible that the compliance substrates cannot provide sufficient vibration absorption characteristics. To address this, for example, if the lateral dimensions of the common flow path and the compliance substrates are increased to improve the vibration absorption characteristics, a problem of the size of the liquid ejecting head being increased would occur, even if the vibration absorption characteristics are improved. In this situation, a technology for a liquid ejecting head that improves the vibration absorption characteristics while mitigating an increase in the size of the liquid ejecting head is desired.

SUMMARY

The present disclosure can be implemented in the following aspects.

A first aspect of the present disclosure provides a liquid ejecting head. The liquid ejecting head includes: a plurality of individual flow paths arranged in a first direction, each individual flow path including a nozzle and a pressure chamber to which a pressure for ejecting liquid through the nozzle is applied; a common flow path communicating in common with the plurality of individual flow paths; piezoelectric elements each located on a first side of the corresponding pressure chamber and configured to apply a pressure to liquid in the pressure chamber to eject liquid through the nozzle, the first side being one side in a second direction intersecting the first direction; a first compliance portion provided at least at a position on the first side of a coupling area in the common flow path where the common flow path is coupled to the plurality of individual flow paths; and a second compliance portion, different from the first compliance portion, provided at least at a position on a second side of the coupling area in the common flow path, the second side being the other side in the second direction and being opposite to the first side, and the first compliance portion and the second compliance portion have an overlapping portion where the first compliance portion and the second compliance portion partially overlap each other as viewed in the second direction.

A second aspect of the present disclosure provides a liquid ejecting apparatus. The liquid ejecting apparatus includes: the liquid ejecting head according to the above first aspect; and a controller configured to control ejection operation of ejecting liquid from the liquid ejecting head.

DESCRIPTION OF EMBODIMENTS

A. First Embodiment

A1. Configuration of Liquid Ejecting Apparatus 1

Figure 1:
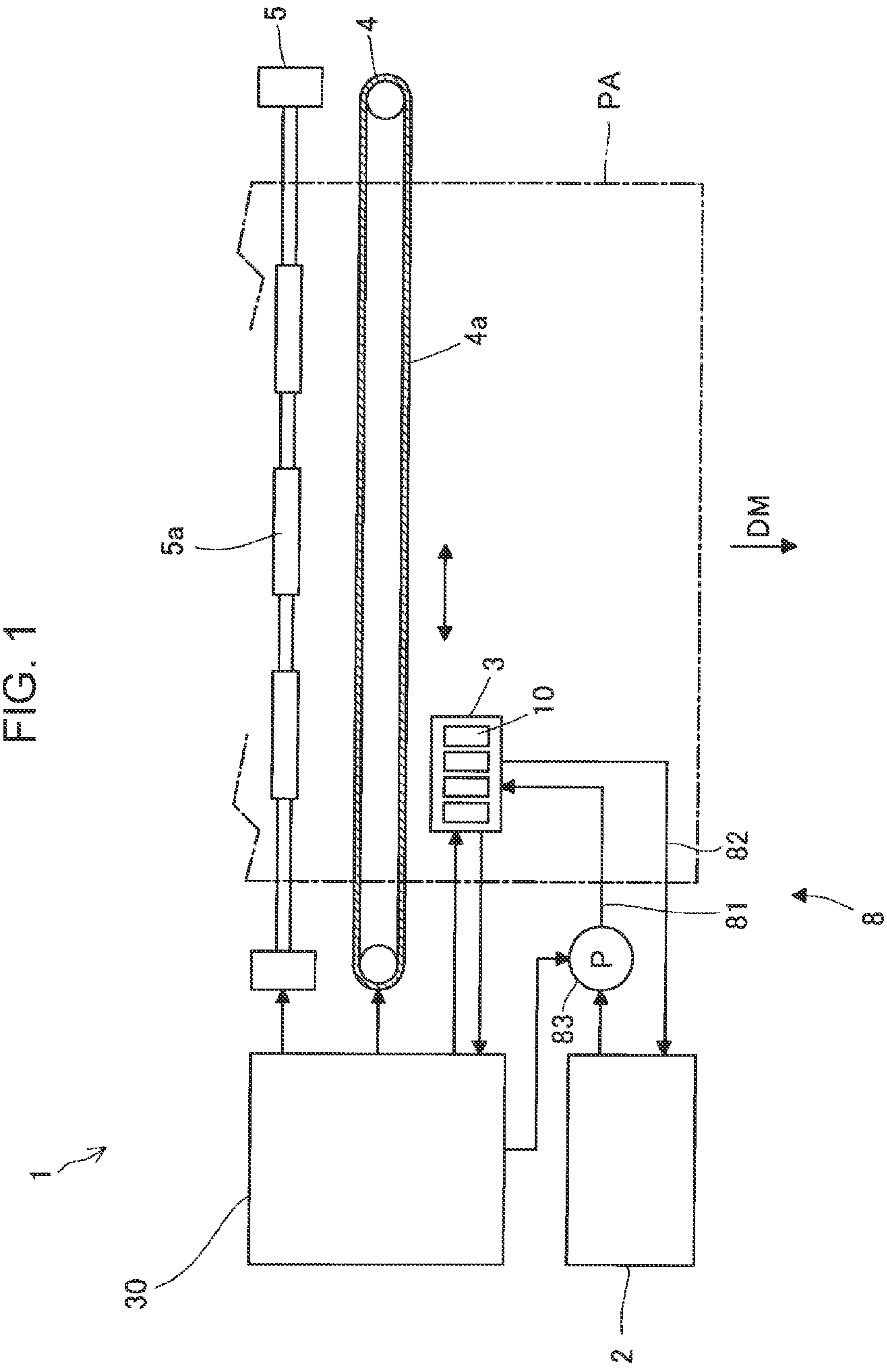
FIG. 1 is an explanatory diagram illustrating the overall configuration of a liquid ejecting apparatus in a first embodiment of the present disclosure.

FIG. 1 is an explanatory diagram illustrating the overall configuration of a liquid ejecting apparatus 1 according to a first embodiment of the present disclosure. In the present embodiment, the liquid ejecting apparatus 1 is an ink jet printer that ejects ink, which is an example of a liquid, onto a print sheet PA, which is a print medium, (hereinafter simply referred to as "sheet PA") to form an image. The liquid ejecting apparatus 1 may be configured to eject ink onto any kinds of media, such as fabrics and resin films, as ink ejection targets, instead of onto the sheet PA.

The liquid ejecting apparatus 1 includes a liquid ejecting head 10 that ejects ink, a liquid container 2 that stores ink, a carriage 3 having the liquid ejecting head 10, a carriage transportation mechanism 4 that transports the carriage 3, a medium transportation mechanism 5 that transports the sheet PA, and a controller 30. The controller 30 is configured to control liquid ejection.

Examples of specific configurations of the liquid container 2 include a cartridge configured to be detachably attached to the liquid ejecting apparatus 1, an ink pack in the form of a bag formed of a flexible film, and an ink tank configured to be refilled with ink. Note that any kind of ink may be stored in the liquid container 2. The liquid ejecting apparatus 1 includes, for example, a plurality of liquid containers 2 associated with four colors of ink. The four colors of ink are, for example, cyan, magenta, yellow, and black. The liquid container 2 may be mounted on the carriage 3.

The liquid ejecting apparatus 1 includes a circulation mechanism 8 that circulates ink. The circulation mechanism 8 includes a supply flow path 81 that supplies ink to the liquid ejecting head 10, a collection flow path 82 that collects the ink discharged from the liquid ejecting head 10, and a pump 83 that causes the ink to flow.

The carriage transportation mechanism 4 includes a transportation belt 4*a* and a motor for transporting the carriage 3. The medium transportation mechanism 5 includes a transportation roller 5*a* and a motor for transporting the sheet PA. The carriage transportation mechanism 4 and the medium transportation mechanism 5 are controlled by the controller 30. The liquid ejecting apparatus 1 ejects ink droplets onto the sheet PA to perform printing by causing the carriage transportation mechanism 4 to transport the carriage 3 while causing the medium transportation mechanism 5 to transport the sheet PA.

Figure 2:
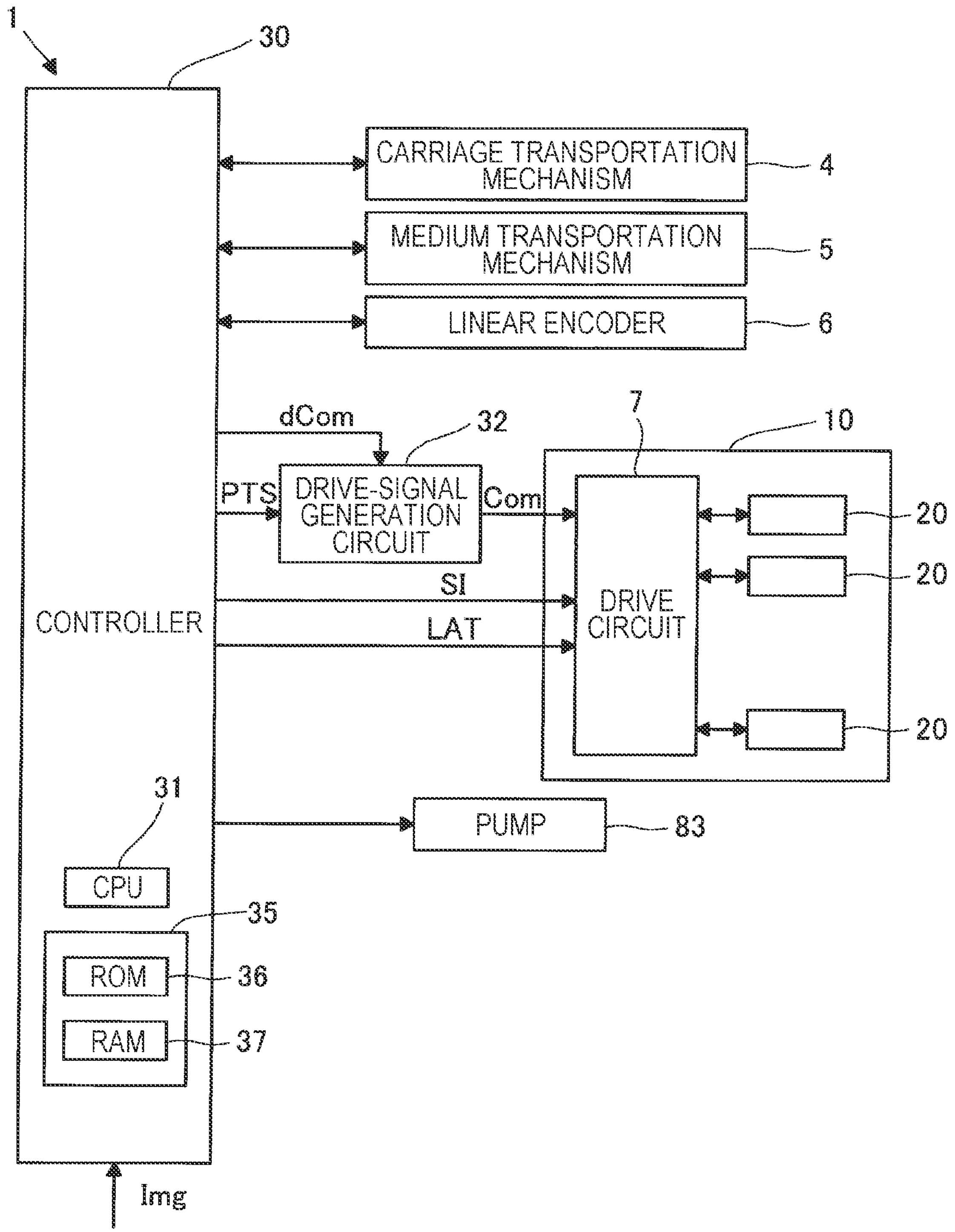
FIG. 2 is a block diagram illustrating the liquid ejecting apparatus.

FIG. 2 is a block diagram illustrating the liquid ejecting apparatus 1. As illustrated in FIG. 2, the liquid ejecting apparatus 1 includes a linear encoder 6. The linear encoder 6 is located at a position where the linear encoder 6 can detect the position of the carriage 3. The linear encoder 6 obtains information on the position of the carriage 3. The linear encoder 6 outputs an encoder signal to the controller 30 along with the movement of the carriage 3.

The controller 30 includes at least one CPU 31. The controller 30 may include an FPGA instead of or in addition to the CPU 31. The controller 30 includes a storage unit 35. The storage unit 35 includes, for example, ROM 36 and RAM 37. The storage unit 35 may include EEPROM or PROM. The storage unit 35 is configured to store print data Img supplied from a host computer. The storage unit 35 stores a control program for the liquid ejecting apparatus 1.

"CPU" is an abbreviation for "central processing unit". "FPGA" is an abbreviation for "field-programmable gate array". "RAM" is an abbreviation for "random access memory". "ROM" is an abbreviation for "read-only memory". "EEPROM" is an abbreviation for "electrically erasable programmable read-only memory". "PROM" is an abbreviation for "programmable read-only memory".

The controller 30 generates a signal for controlling the operation of each unit in the liquid ejecting apparatus 1. The controller 30 is configured to generate a print signal SI and a waveform specifying signal dCom. The print signal SI is a digital signal for specifying the type of operation of the liquid ejecting head 10. The print signal SI is configured to specify whether to supply a drive signal Com to each piezoelectric element 20. The waveform specifying signal dCom is a digital signal that defines the waveform of the drive signal Com. The drive signal Com is an analog signal for driving each piezoelectric element 20.

The liquid ejecting apparatus 1 includes a drive-signal generation circuit 32. The drive-signal generation circuit 32 is electrically coupled to the controller 30. The drive-signal generation circuit 32 includes a DA conversion circuit. The drive-signal generation circuit 32 generates the drive signal Com having a waveform defined by the waveform specifying signal dCom. The controller 30, when receiving an encoder signal from the linear encoder 6, outputs a timing signal PTS to the drive-signal generation circuit 32. The timing signal PTS defines the timing at which the drive signal Com is to be generated. The drive-signal generation circuit 32 outputs the drive signal Com each time the timing signal PTS is received.

A drive circuit 7 is electrically coupled to the controller 30 and the drive-signal generation circuit 32. The drive circuit 7 switches between whether or not to supply the drive signal Com to each piezoelectric element 20 in accordance with the print signal SI. The drive circuit 7 is configured to select, in accordance with the print signal SI, a latch signal LAT, and a change signal CH supplied by the controller 30, the piezoelectric elements 20 to which the drive signal Com is to be supplied. The latch signal LAT defines the latch timing at which the print data Img is to be latched. The change signal CH defines the selection timing at which a drive pulse included in the drive signal Com is to be selected.

The controller 30 controls ink ejection operation of the liquid ejecting head 10. The controller 30 drives the piezoelectric elements 20 to change the pressure of ink in pressure chambers C and to eject ink through nozzles N. Detailed configurations of the piezoelectric element 20, the pressure chamber C, the nozzle N, and the like will be described later. The controller 30 controls ejection operation when performing a print operation.

A2. Configuration of Liquid Ejecting Head 10

Figure 3:
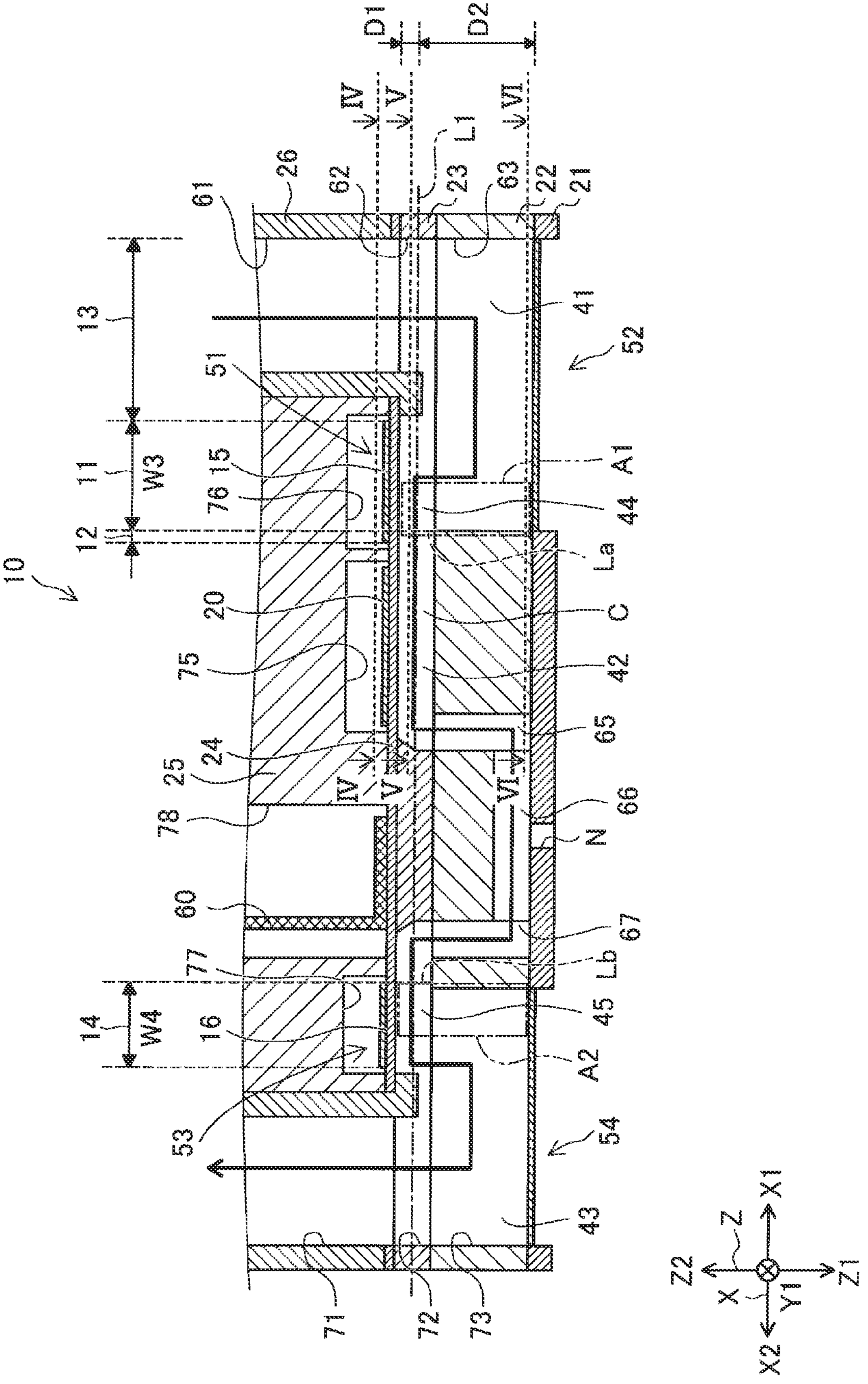
FIG. 3 is a partial cross-sectional view of a liquid ejecting head.

Next, the configuration of the liquid ejecting head 10 will be described. The liquid ejecting head 10 employs a circulation method in which liquid is circulated through a supply-side common flow path 41, individual flow paths 42, and a discharge-side common flow path 43 described later. FIG. 3 is a partial cross-sectional view of the liquid ejecting head 10. In the following description, the three directions intersecting one another are referred to as the X-axis direction, the Y-axis direction, and the Z-axis direction.

The X-axis direction corresponds to the right-left direction in FIG. 3 and includes the X1 direction (the right direction in FIG. 3) and the X2 direction (the left direction in FIG. 3) opposite to each other. The X-axis direction is an example of a third direction. The Y-axis direction includes the Y1 direction and the Y2 direction opposite to each other. The Y1 direction is the direction into the drawing plane in FIG. 3. The Y2 direction is the direction out of the drawing plane in FIG. 3. The Y-axis direction is an example of a first direction. The Z-axis direction corresponds to the up-down direction in FIG. 3 and includes the Z1 direction (the downward direction in FIG. 3) and the Z2 direction (the upward direction in FIG. 3) opposite to each other. The Z-axis direction is an example of a second direction.

In addition, the Z2 side is an example of a first side, and the Z1 side is an example of a second side. The X-axis direction, the Y-axis direction, and the Z-axis direction are orthogonal to one another. Although the Z-axis direction is typically the up-down direction, the Z-axis direction does not have to be the up-down direction. In the following description, the Z1 direction is referred to as "upward" in some cases, and the Z2 direction is referred to as "downward" in some cases.

In the present specification, the terms "supply side" and "discharge side" are used in some cases. The supply side is the portion of the liquid flow path upstream of the nozzles N. Components related to portions upstream of the nozzles N are referred to using "supply side" in some cases, and components related to portions downstream of the nozzles N are referred to using "discharge side" in some cases.

The liquid ejecting head 10 includes a nozzle substrate 21, a communication plate 22, a pressure chamber substrate 23, a vibration plate 24, a sealing plate 25, and piezoelectric elements 20. The liquid ejecting head 10 also includes a case 26 and a COF 60. "COF" is an abbreviation for "chip on film". In addition, the liquid ejecting head 10 includes the supply-side common flow path 41, the plurality of individual flow paths 42, the discharge-side common flow path 43, the plurality of pressure chambers C, a supply-side absorption chamber 44, a discharge-side absorption chamber 45, a first compliance portion 51, a second compliance portion 52, a third compliance portion 53, and a fourth compliance portion 54. Since the plurality of individual flow paths 42 and the plurality of pressure chambers C are aligned in the Y-axis direction, FIG. 3 illustrates only one each of these components. The present embodiment describes the liquid ejecting head 10 that ejects ink, which is an example of a liquid. The liquid is not limited to ink, and the liquid ejecting head 10 is configured to eject other types of liquid.

The thickness directions of the nozzle substrate 21, the communication plate 22, the pressure chamber substrate 23, the vibration plate 24, the sealing plate 25, and the case 26 correspond to the Z-axis direction. The nozzle substrate 21 is located at the bottom of the liquid ejecting head 10. The communication plate 22 is located on the Z2 direction side of the nozzle substrate 21. The pressure chamber substrate 23 is located on the Z2 direction side of the communication plate 22. In other words, the communication plate 22 is located between the pressure chamber substrate 23 and the nozzle substrate 21. The vibration plate 24 is located on the Z2 direction side of the pressure chamber substrate 23. The vibration plate 24 is formed of, for example, $SiO_2$. The vibration plate 24 is a member separate from the pressure chamber substrate 23. The vibration plate 24 may be attached to the pressure chamber substrate 23 with an adhesive or may be formed on the surface of the pressure chamber substrate 23 facing the Z2 direction by treatment such as thermal oxidation.

The sealing plate 25 is located on the Z2 direction side of the vibration plate 24. The sealing plate 25 covers the vibration plate 24, the first compliance portion 51 and the third compliance portion 53, the piezoelectric elements 15, 16, and 20, and the pressure chamber substrate 23. The case 26 is located on the sealing plate 25. The piezoelectric elements 20 are provided to be associated with the pressure chambers C.

Description of Flow Path

First, the liquid flow path formed in the liquid ejecting head 10 will be described. The liquid flow path includes a supply port and a discharge port (not illustrated), the supply-side common flow path 41, the plurality of individual flow paths 42, and the discharge-side common flow path 43. The boundary La between the supply-side common flow path 41 and the individual flow paths 42 is indicated by a dashed line in FIG. 3. Note that a publicly known flow restrictor (not illustrated) is provided at the boundary between the supply-side common flow path 41 and each individual flow path 42.

The supply-side common flow path 41 is provided to be common to the plurality of pressure chambers C. The supply-side common flow path 41 is continuous in the Y-axis direction along the plurality of pressure chambers C. The supply-side common flow path 41 includes a liquid chamber portion 61 formed in the case 26, a liquid chamber portion 62 formed in the pressure chamber substrate 23, and a liquid chamber portion 63 formed in the communication plate 22. These liquid chamber portions 61, 62, and 63 are continuous in the Z-axis direction.

The supply-side absorption chamber 44 is located in the X1 direction relative to the pressure chambers C. The supply-side absorption chamber 44 communicates with upstream portions of the pressure chambers C. The supply-side absorption chamber 44 is part of the supply-side common flow path 41.

The plurality of individual flow paths 42 are provided for the respective pressure chambers C and aligned in the Y-axis direction. The individual flow paths 42 are located downstream of the supply-side common flow path 41. The individual flow paths 42 communicate with a downstream portion of the liquid chamber portion 62 formed in the pressure chamber substrate 23. Each individual flow path 42 includes a pressure chamber C, a first communication flow path 65, a second communication flow path 66, and a third communication flow path 67 in this order from upstream to downstream.

The plurality of pressure chambers C communicate with the respective nozzles N via the first communication flow paths 65 and the second communication flow paths 66. Each nozzle N is located in the Z1 direction relative to the corresponding pressure chamber C. The plurality of first communication flow paths 65 extend in the Z-axis direction. The plurality of second communication flow paths 66 are coupled to Z1-direction end portions of the first communication flow paths 65 and extend in the X2 direction. The nozzles N are located substantially at the center of the second communication flow paths 66 in the X-axis direction. The plurality of third communication flow paths 67 are coupled to X2-direction end portions of the second communication flow paths 66 and extend in the Z2 direction.

The discharge-side common flow path 43 is provided to be common to the plurality of pressure chambers C. The discharge-side common flow path 43 communicates in common with the plurality of individual flow paths 42. The discharge-side common flow path 43 communicates with each pressure chamber C via the corresponding individual flow path 42. The discharge-side common flow path 43 is located downstream of the individual flow paths 42.

The discharge-side common flow path 43 is continuous in the Y-axis direction. The discharge-side common flow path 43 includes a liquid chamber portion 71 formed in the case 26, a liquid chamber portion 72 formed in the pressure chamber substrate 23, and a liquid chamber portion 73 formed in the communication plate 22. These liquid chamber portions 71, 72, and 73 are continuous in the Z-axis direction. Note that the liquid chamber portions 61 and 71 are through holes formed in the case 26.

Description of Each Substrate

Figure 4:
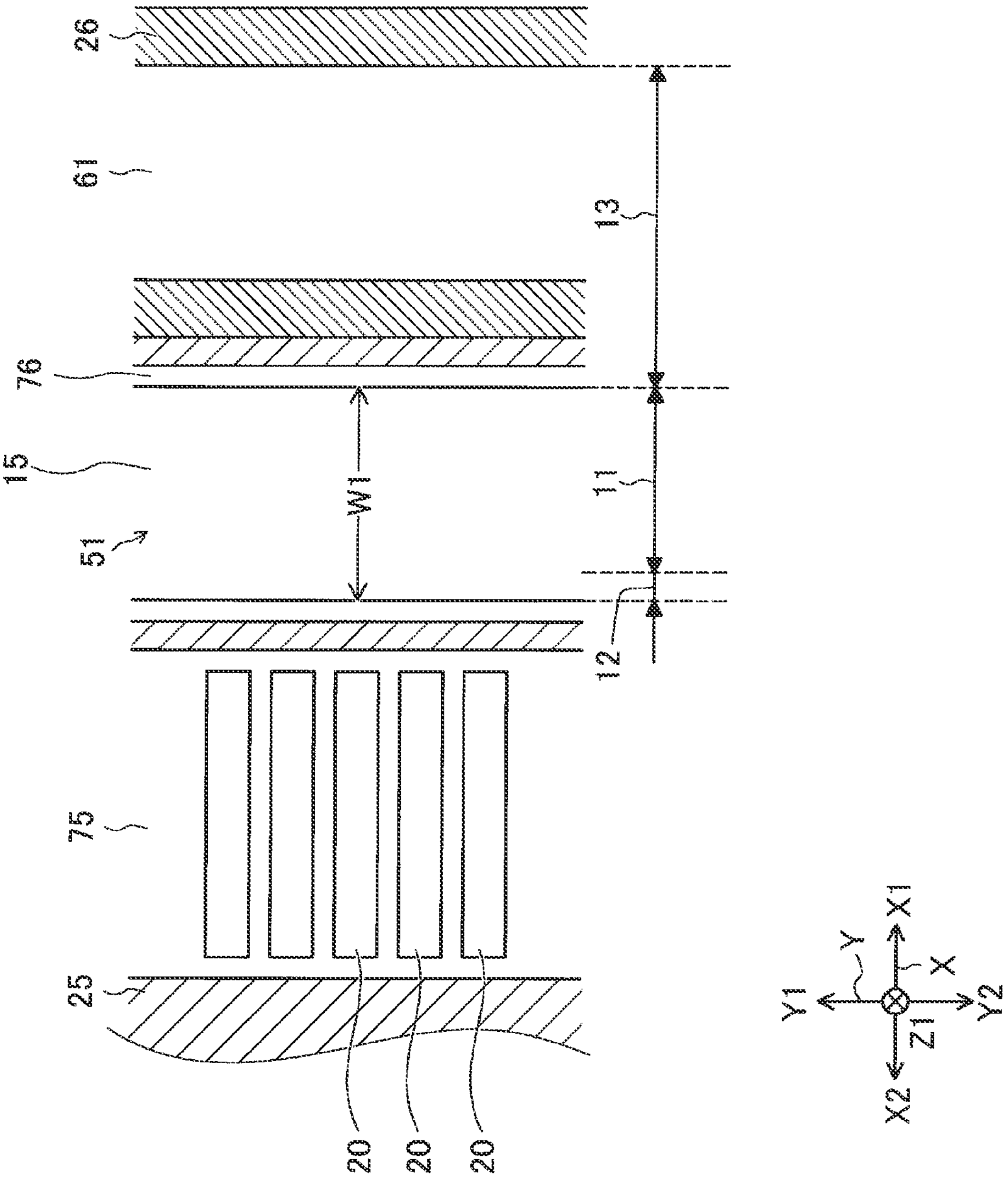
FIG. 4 is a cross-sectional view of the liquid ejecting head taken along line IV-IV in FIG. 3.
Figure 5:
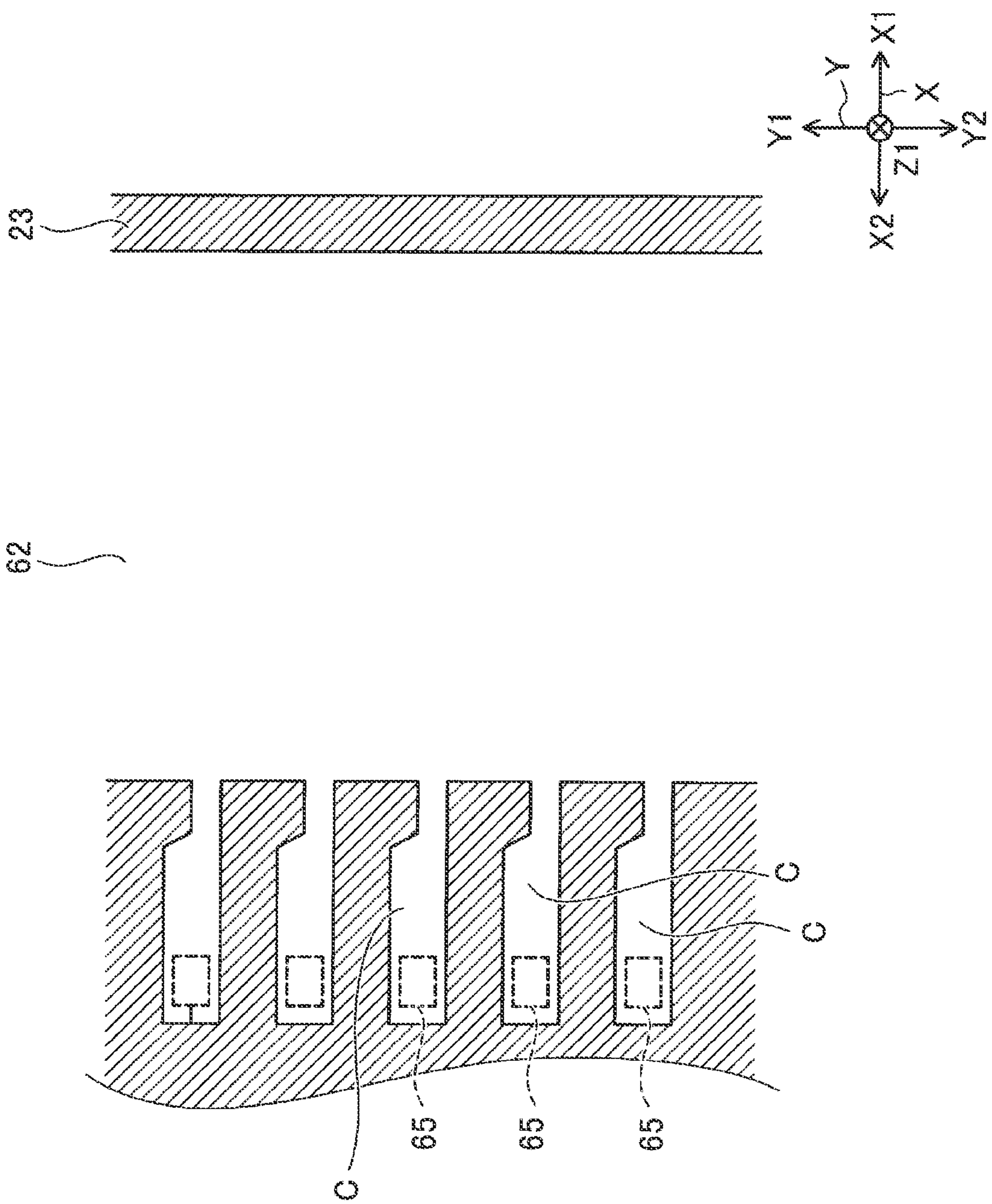
FIG. 5 is a cross-sectional view of the liquid ejecting head taken along line V-V in FIG. 3.
Figure 6:
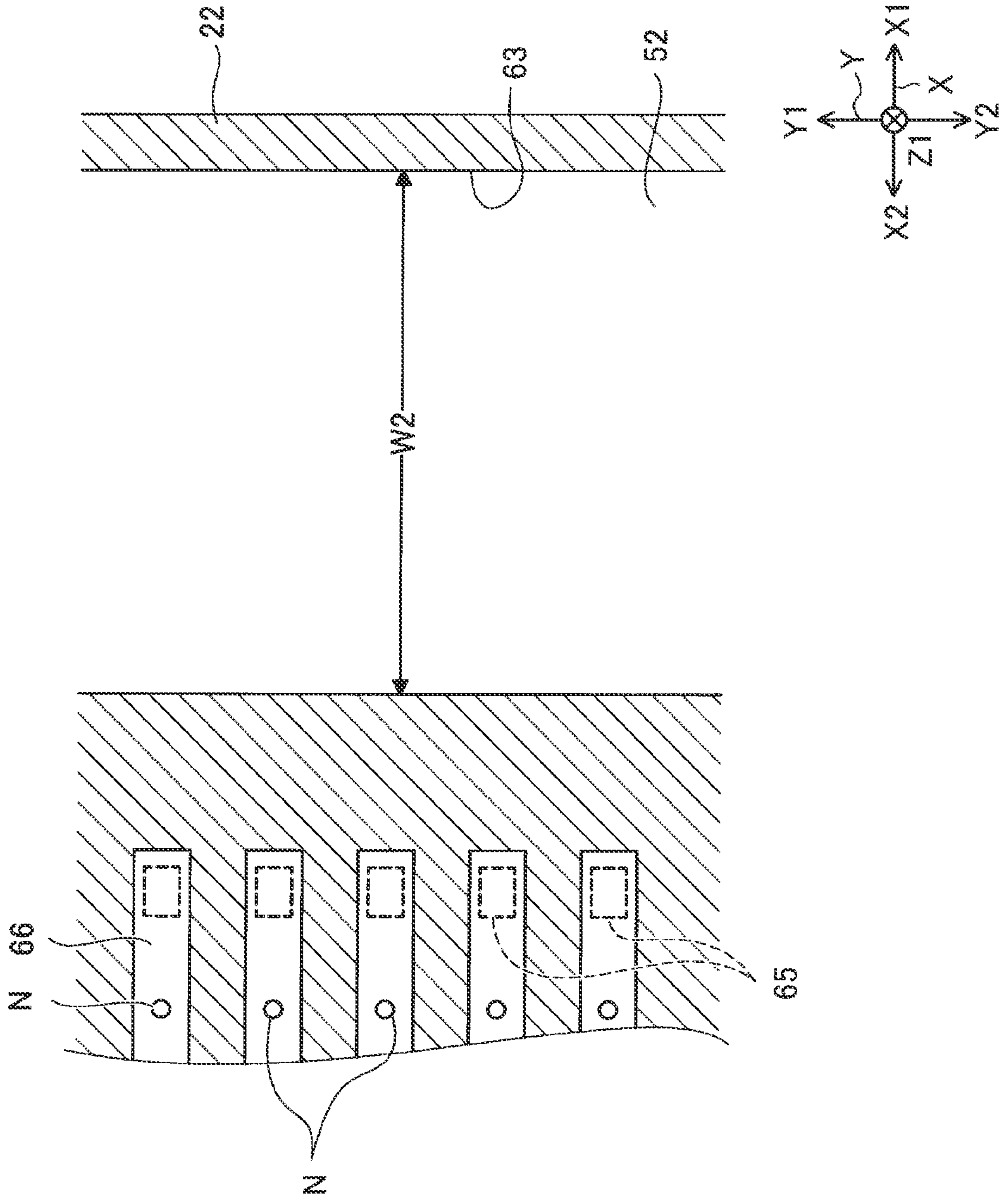
FIG. 6 is a cross-sectional view of the liquid ejecting head taken along line VI-VI in FIG. 3.

FIGS. 4 to 6 are cross-sectional views of the liquid ejecting head. FIG. 4 is a cross-sectional view taken along line IV-IV in FIG. 3, FIG. 5 is a cross-sectional view taken along line V-V in FIG. 3, and FIG. 6 is a cross-sectional view taken along line VI-VI in FIG. 3. In the following, the structure of each substrate included in the liquid ejecting head 10 will be described with reference to FIGS. 3 to 6 as necessary. As illustrated in FIG. 3, the nozzle substrate 21 has the nozzles N extending through the nozzle substrate 21 in the Z direction. As described above, the liquid ejecting head 10 ejects liquid through these nozzles N. In the nozzle substrate 21, the plurality of nozzles N arranged in the Y-axis direction form a nozzle row. The nozzle substrate 21 is formed of, for example, a metal such as stainless steel, an organic substance such as a polyimide resin, a silicon single crystal substrate, or the like.

As illustrated in FIGS. 3 and 5, the pressure chamber substrate 23 has the supply-side liquid chamber portion 62, the supply-side absorption chamber 44, the pressure chambers C, the discharge-side absorption chamber 45, and the discharge-side liquid chamber portion 72. The pressure chambers C, the absorption chambers 44 and 45, and the liquid chamber portions 62 and 72 are part of the liquid flow path. The pressure chambers C, the absorption chambers 44 and 45, and the liquid chamber portions 62 and 72 extend in the X-axis direction. The pressure chambers C, the absorption chambers 44 and 45, and the liquid chamber portions 62 and 72 each extend through the pressure chamber substrate 23 in the Z-axis direction. The pressure chambers C, the absorption chambers 44 and 45, and the liquid chamber portions 62 and 72 each have a specified capacity.

The plurality of pressure chambers C are aligned in the Y-axis direction at specified intervals. The set of pressure chambers C is located at the same position in the Y-axis direction as the supply-side absorption chamber 44 and the discharge-side absorption chamber 45. The pressure chambers C and the supply-side absorption chamber 44 located at the same position in the Y-axis direction adjoin each other and communicate with each other in the X-axis direction. The supply-side liquid chamber portion 62, together with the liquid chamber portion 61 formed in the case 26 and the liquid chamber portion 63 formed in the communication plate 22, forms the supply-side common flow path 41.

The pressure chamber substrate 23 in the present embodiment is formed of a silicon single crystal substrate. In another embodiment, the pressure chamber substrate 23 may be formed of, for example, a metal such as stainless steel (SUS) or nickel (Ni); a ceramic material typified by zirconia ($ZrO_2$) or alumina ($Al_2O_3$); a glass-ceramic material; and an oxide such as magnesium oxide (MgO) or lanthanum aluminate ($LaAlO_3$); or the like. In the present embodiment, the pressure chambers C and the absorption chambers 44 and 45 are formed by, for example, processing the pressure chamber substrate 23 by anisotropic etching. Details of the functions of the pressure chambers C and the absorption chambers 44 and 45 will be described later.

The communication plate 22 is located between the nozzle substrate 21 and the pressure chamber substrate 23 and is fixed to the nozzle substrate 21 with an adhesive or the like. The communication plate 22 is formed of, for example, a silicon single crystal substrate. As illustrated in FIGS. 3 and 6, the communication plate 22 has the supply-side liquid chamber portion 63, the discharge-side liquid chamber portion 73, the first communication flow paths 65, the second communication flow paths 66, and the third communication flow paths 67. Each of the liquid chamber portions 63 and 73, the first communication flow paths 65, and the third communication flow paths 67 extends through the communication plate 22 in the Z direction. The second communication flow paths 66 do not extend through the communication plate 22 in the Z direction. The second communication flow paths 66 are recesses in the lower surface of the communication plate 22. The liquid chamber portion 73, together with the liquid chamber portion 71 formed in the case 26 and the liquid chamber portion 72 formed in the pressure chamber substrate 23, forms the discharge-side common flow path 43.

As illustrated in FIG. 3, the sealing plate 25 is a member having recesses in the lower surface in the Z1 direction. The recesses are open on the Z2 side of the pressure chambers C and the absorption chambers 44 and 45 at the positions facing the pressure chambers C and the absorption chambers 44 and 45. Specifically, the recesses of the sealing plate 25 of the present embodiment are a first recess 75, a second recess 76, and a third recess 77.

The first recess 75 is open at a position facing the pressure chambers C. The second recess 76 is open at a position facing the supply-side absorption chamber 44. The third recess 77 is open at a position facing the discharge-side absorption chamber 45. The recesses 75, 76, and 77 are separated by wall portions formed as parts of the sealing plate 25. In the present embodiment, the depth of the opening in each of the recesses 75, 76, and 77 is the same. In other words, the dimension of each of the recesses 75, 76, and 77 in the Z direction is the same.

The recesses 75, 76, and 77 do not communicate with the liquid flow path, and hence, liquid does not flow in the recesses 75, 76, and 77. Of the widths of the recesses 75, 76, and 77 in the X-axis direction, the width of the first recess 75 is the largest, the width of the second recess 76 is the second largest, and the width of the third recess 77 is the smallest. As illustrated in FIGS. 3 and 4, the first recess 75, the second recess 76, and the third recess 77 extend across the width of the liquid ejecting head 10 in the Y-axis direction. The widths of the second recess 76 and the third recess 77 in the Y-axis direction are the same. The sealing plate 25 has a through hole 78 extending through the sealing plate 25 in the Z-axis direction at a position on the X2 direction side of the center portion in the X-axis direction. The above COF 60 is inserted into the through hole 78.

The vibration plate 24 is stacked on the pressure chamber substrate 23. The piezoelectric elements 15, 16, and 20 are stacked on the vibration plate 24. The plurality of piezoelectric elements 20 are located in the first recess 75. The piezoelectric element 15 is located in the second recess 76. The piezoelectric element 16 is located in the third recess 77. Each of the piezoelectric elements 20 associated with the pressure chambers C located in the first recess 75 is an actuator including, for example, a first electrode, a piezoelectric material, and a second electrode (not illustrated) stacked in the Z1 direction. In FIG. 3, illustration of the wiring portions for electrically coupling the first electrodes and the second electrodes to the COF 60 is omitted. In the present embodiment, the piezoelectric elements 15 and 16 located in the second recess 76 and the third recess 77 have configurations the same as or similar to the configuration of the actuator located in the first recess 75.

Description of Compliance Portion

Next, the configurations of the first compliance portion 51 to the fourth compliance portion 54 will be described. The first compliance portion 51 is an absorbing portion for absorbing vibration of liquid on the supply side. The first compliance portion 51 is located at least at a position on the Z2 side of a coupling area A1 in the supply-side common flow path 41 where the supply-side common flow path 41 is coupled to the plurality of individual flow paths 42.

Here, the coupling area A1 is an area in the periphery of the portion coupling the supply-side common flow path 41 to the individual flow paths 42, the area belonging to the supply-side common flow path 41. As indicated by a rectangle of dashed double-dotted lines in FIG. 3, the coupling area A1 is, for example, a portion upstream of the boundary La between the supply-side common flow path 41 and the individual flow paths 42 and downstream of the liquid chamber portion 61 formed in the case 26, the portion being in the Z1 direction and in the X2 direction relative to the liquid chamber portion 61. Although the X1-side end of the coupling area A1 is set around the center of the first compliance portion 51 in FIG. 3, the X1-side end of the coupling area A1 may be set further in the X1 direction or further in X2 direction as long as the above conditions are satisfied. The same is true of a coupling area A2 described later.

The first compliance portion 51 includes the vibration plate 24 and the piezoelectric element 15. As illustrated in FIG. 4, the first compliance portion 51 is continuous in the Y-axis direction across the width of the discharge-side common flow path 43 in the Y-axis direction. The piezoelectric element 15 continuous in the Y-axis direction across the width of the vibration plate 24 in the Y-axis direction is formed on the vibration plate 24. The width W1 of the first compliance portion 51 in the X-axis direction corresponds to the width of the piezoelectric element 15 in the X-axis direction. The vibration plate 24 is configured to deform when receiving the pressure of the liquid. The vibration plate 24 is configured to absorb a fluctuation in the pressure of the liquid in the supply-side absorption chamber 44 by deforming in response to the pressure of the liquid. The piezoelectric element 15 is located at a position where the piezoelectric element 15 overlaps the supply-side absorption chamber 44 as viewed in the Z-axis direction.

The second compliance portion 52 is an absorbing portion for absorbing vibration of liquid on the supply side. The second compliance portion 52 is located on the Z1 direction side of the communication plate 22. Specifically, the second compliance portion 52 is located at least at a position on the Z1 side of the coupling area A1 in the supply-side common flow path 41. The second compliance portion 52 is a flexible film that absorbs a fluctuation in the pressure of the liquid in the supply-side common flow path 41. As illustrated in FIG. 3, the second compliance portion 52 is located at the lower surface of the communication plate 22 so as to close the Z1-direction-side opening of the liquid chamber portion 63 in the communication plate 22 and serves as a wall surface (specifically, a bottom surface) of the supply-side common flow path 41.

Here, the line L1 on the XY plane passing through the center position of the pressure chambers C in the Z direction and including the X-axis and the Y-axis is defined as the reference position of the pressure chambers C. The distance D1 between the pressure chambers C and the first compliance portion 51 in the Z-axis direction is shorter than the distance D2 between the pressure chambers C and the second compliance portion 52 in the Z-axis direction. The distance D1 is from the reference position of the pressure chambers C to the bottom surface of the vibration plate 24 and corresponds to an example of a distance between the pressure chambers C and the first compliance portion 51 in the second direction. The distance D2 is from the reference position of the pressure chambers C to the upper surface of the second compliance portion 52 and corresponds to an example of a distance between the pressure chambers C and the second compliance portion 52 in the second direction. Note that the flow path length from the pressure chambers C to the first compliance portion 51 is shorter than the flow path length from the pressure chambers C to the second compliance portion 52.

The thickness of the second compliance portion 52 in the Z-axis direction is smaller than the thickness of the first compliance portion 51 in the Z-axis direction. The width W2 (see FIG. 6) of the second compliance portion 52 in the X-axis direction is larger than the width W1 (see FIG. 4) of the first compliance portion 51 in the X-axis direction. The width of the first compliance portion 51 in the Y-axis direction and the width of the second compliance portion 52 in the Y-axis direction are substantially the same.

Young's modulus of the second compliance portion 52 is smaller than Young's modulus of the first compliance portion 51. Here, Young's modulus of the first compliance portion 51 can be calculated by regarding the first compliance portion 51 as one layered film. Specifically, Young's modulus of the first compliance portion 51 can be calculated by multiplying Young's modulus of a film of each layer by a weighting factor to perform weighting and obtaining the average of the weighted values of all the layers. The weighting factor is, for example, a constant corresponding to the thickness of each film.

The first compliance portion 51 and the second compliance portion 52 have an overlapping portion 11 where they partially overlap as viewed in the Z-axis direction. The first compliance portion 51 has a first non-overlapping portion 12 where the first compliance portion 51 does not overlap the second compliance portion 52 as viewed in the Z-axis direction. The second compliance portion 52 has a second non-overlapping portion 13 where the second compliance portion 52 does not overlap the first compliance portion 51 as viewed in the Z-axis direction. The area of the first non-overlapping portion 12 viewed in the Z-axis direction is smaller than the area of the second non-overlapping portion 13 viewed in the Z-axis direction.

With respect to the physical properties, the dimensions, and the like of the first compliance portion 51 and the second compliance portion 52 described above, the compliance performance of the second compliance portion 52 is higher than the compliance performance of the first compliance portion 51. Here, "compliance performance" has the same meaning as "compliance volume" and can be expressed by the following expression (1).

[Math. 1]

[Math. 1]

$$C = \frac{1 - v^2}{60E} \cdot \frac{w^5 l}{t^3} \qquad (1)$$

In expression (1), v is Poisson's ratio of the vibration plate 24 and serves as a physical property value of the material forming the compliance portion. E is Young's modulus and serves as a physical property value of the material forming the compliance portion.

In expression (1), w is the length in the X-axis direction of the opening covered by the compliance portion, l is the length in the Y-axis direction of the opening covered by the compliance portion, and t is the thickness of the compliance portion. Here, because $w<l$, the above symbols represent the above conditions. However, when $w>l$, w represents the length in the Y-axis direction, and l represents the length in the X-axis direction.

The third compliance portion 53 is an absorbing portion for absorbing vibration of liquid on the discharge side. The third compliance portion 53 is located at least at a position on the Z2 side of a second coupling area A2 in the discharge-side common flow path 43 where the discharge-side common flow path 43 is coupled to the plurality of individual flow paths 42. Here, the second coupling area A2 is an area in the periphery of the portion coupling the discharge-side common flow path 43 to the individual flow paths 42, the area belonging to the discharge-side common flow path 43. As indicated by a rectangle of dashed double-dotted lines in FIG. 3, the second coupling area A2 is, for example, a portion downstream of the boundary line Lb between the discharge-side common flow path 43 and the individual flow paths 42 and upstream of the liquid chamber portion 71 formed in the case 26, the portion being in the X1 direction and in the Z1 direction relative to the liquid chamber portion 71.

The third compliance portion 53 has a configuration substantially the same as that of the first compliance portion 51 and includes the vibration plate 24 and the piezoelectric element 16. The vibration plate 24 included in the third compliance portion 53 is continuous in the Y-axis direction. The width of the third compliance portion 53 in the X-axis direction corresponds to the width of the plurality of piezoelectric elements 16 in the X-axis direction. The vibration plate 24 is configured to deform when receiving the pressure of the liquid. The vibration plate 24 is configured to absorb a fluctuation in the pressure of the liquid in the discharge-side absorption chamber 45 by deforming in response to the pressure of the liquid.

The piezoelectric element 16 continuous in the Y-axis direction across the width of the vibration plate 24 in the Y-axis direction is formed on the vibration plate 24. The piezoelectric element 16 is located at a position where the piezoelectric element 16 overlaps the plurality of absorption chambers 45 as viewed in the Z-axis direction.

The fourth compliance portion 54 is an absorbing portion for absorbing vibration of liquid on the discharge side. The fourth compliance portion 54 is located on the Z1 direction side of the communication plate 22. Specifically, the fourth compliance portion 54 is located at least at a position on the Z1 side of the second coupling area A2 in the discharge-side common flow path 43. The fourth compliance portion 54 is a flexible film that absorbs a fluctuation in the pressure of the liquid in the discharge-side common flow path 43. The fourth compliance portion 54 is located at the lower surface of the communication plate 22 so as to close the Z1-direction-side opening of the liquid chamber portion 73 in the communication plate 22 and serves as a wall surface (specifically, a bottom surface) of the discharge-side common flow path 43.

Here, the distance between the pressure chambers C and the third compliance portion 53 in the Z-axis direction is the same as the distance D1 between the pressure chambers C and the first compliance portion 51 in the Z-axis direction. The distance between the pressure chambers C and the fourth compliance portion 54 in the Z-axis direction is the same as the distance D2 between the pressure chambers C and the second compliance portion 52 in the Z-axis direction. In other words, the distance D1 between the pressure chambers C and the third compliance portion 53 in the Z-axis direction is shorter than the distance D2 between the pressure chambers C and the fourth compliance portion 54 in the Z-axis direction.

The thickness of the fourth compliance portion 54 in the Z-axis direction is smaller than the thickness of the third compliance portion 53 in the Z-axis direction. The width of the fourth compliance portion 54 in the X-axis direction is larger than the width of the third compliance portion 53 in the X-axis direction. The width of the third compliance portion 53 in the Y-axis direction and the width of the fourth compliance portion 54 in the Y-axis direction are substantially the same.

Young's modulus of the fourth compliance portion 54 is smaller than Young's modulus of the third compliance portion 53. Here, as in the case of the first compliance portion 51, Young's modulus of the third compliance portion 53 can be calculated by regarding the third compliance portion 53 as one layered film.

The third compliance portion 53 and the fourth compliance portion 54 have a second overlapping portion 14 where they partially overlap as viewed in the Z-axis direction. The width W4 of the second overlapping portion 14 in the X-axis direction is smaller than the width W3 of the overlapping portion 11 in the X-axis direction. The area of the second overlapping portion 14 is smaller than the area of the overlapping portion 11.

In a X2 direction side portion of the fourth compliance portion 54 on the discharge-side common flow path 43, the fourth compliance portion 54 has a non-overlapping portion where the fourth compliance portion 54 does not overlap the third compliance portion 53 as viewed in the Z-axis direction. The compliance performance of the fourth compliance portion 54 is higher than the compliance performance of the third compliance portion 53. The compliance performance of the third compliance portion 53 is lower than the compliance performance of the first compliance portion 51. In addition, the compliance performance of the second compliance portion 52 is higher than the compliance performance of the fourth compliance portion 54.

Note that it is preferable to form the compliance portions 51 to 54 each with sufficient flexibility to absorb vibration of liquid propagated from the pressure chambers C by adjusting the materials forming the above compliance portions 51 to 54, the thicknesses of the compliance portions 51 to 54, and the like. When compliance portions include members forming the piezoelectric elements 15 and 16 to effectively absorb vibration of liquid, as with the first and third compliance portions 51 and 53 of the present embodiment, it is preferable that the compliance portions each have a configuration which ensures that no piezoelectric strain occurs when a voltage is applied to the piezoelectric material. Specifically, since the piezoelectric elements 15 and 16 located in the second recess 76 and the third recess 77 are not for applying pressure to the liquid in the pressure chambers, unlike the piezoelectric elements 20 in the first recess 75, it is preferable that the piezoelectric elements 15 and 16 not be electrically coupled to the controller 30.

Description of Operation and Flow of Liquid

The liquid in the liquid container 2, being caused to flow by the pump 83, flows in the supply flow path 81 through the supply port (not illustrated) into the supply-side common flow path 41. The liquid in the supply-side common flow path 41 passes through the supply-side absorption chamber 44 and is supplied to the pressure chambers C which are parts of the individual flow paths 42. Some of the liquid in the pressure chambers C is ejected through the nozzles N.

The liquid not ejected through the nozzles N passes through the second communication flow paths 66, the third communication flow paths 67, and the discharge-side absorption chamber 45, which is part of the individual flow paths 42, and flows into the discharge-side common flow path 43. The liquid in the discharge-side common flow path 43 flows into the collection flow path 82 via the discharge port (not illustrated) and is collected into the liquid container 2. In the liquid ejecting head 10, liquid circulates as described above.

In the foregoing pressure chamber C, vibration of the vibration plate 24 applies pressure to the liquid in the pressure chamber C. The vibration plate 24 vibrates when the piezoelectric element 20 is driven. Specifically, when a voltage is applied to the piezoelectric material, piezoelectric strain occurs in an active portion of the piezoelectric material, the active portion being stacked between the first electrode and the second electrode in the Z direction. The piezoelectric strain in the piezoelectric element 20 causes the vibration plate 24 to vibrate so as to bend, thereby changing the capacity of the pressure chamber to apply pressure to the liquid in the pressure chamber C. Note that when a voltage is applied to the piezoelectric material in the inactive portion of the piezoelectric material that is not stacked between the first electrode and the second electrode in the Z direction, the above piezoelectric strain does not occur.

As described above, the liquid ejecting head 10 applies pressure to the liquid in the pressure chamber C to eject liquid through the nozzle N. Here, when pressure is applied to the liquid in the pressure chamber C, some of the liquid in the pressure chamber C flows into the liquid chamber portions or the like located upstream of the pressure chamber C and common to the plurality of pressure chambers C, and the vibration of the liquid propagates from the pressure chamber C to the liquid chamber portions or the like. Here, when pressure is applied to the liquid in the plurality of pressure chambers C, the liquid flowing from a pressure chamber C to the liquid chamber portions and the like is affected in a manner in which, for example, the flow is obstructed by the liquid flowing from another pressure chamber C to the liquid chamber portions and the like. Hence, how the vibration of liquid propagates from a pressure chamber C varies in accordance with the effects of propagation of the vibration of liquid from another pressure chamber C, and the stability of the quality of the liquid ejected from the nozzle N via the pressure chamber C can deteriorate.

The liquid ejecting head 10 and the liquid ejecting apparatus 1 of the first embodiment described above provide the following advantageous effects.

The supply-side absorption chamber 44 described above absorbs vibration of liquid propagated from the pressure chambers C. Specifically, the first compliance portion 51 located on the Z2 direction side of the supply-side absorption chamber 44 and the second compliance portion 52 located on the Z1 direction side of the supply-side absorption chamber 44 absorb vibration of liquid by bending in accordance with the vibration of liquid propagated from the pressure chambers C to the absorption chamber 44. As illustrated in FIG. 3, the pressure chambers C and the supply-side absorption chamber 44 are located at the same position in the Z-axis direction and adjoin each other in the X-axis direction. The first compliance portion 51 located at the adjoining position, in other words, at a closer position, can effectively absorb vibration of liquid propagated from the pressure chambers C.

The compliance performance of the second compliance portion 52 is higher than the compliance performance of the first compliance portion 51. Thus, also the second compliance portion 52 farther than the first compliance portion 51 from the pressure chambers C can effectively absorb vibration of liquid.

The closer to the piezoelectric elements 20 in the pressure chambers C, where vibration is stronger, the stronger the vibration. Hence, if considering only absorption of vibration due to ejection, it is fundamentally preferable that the compliance performance of the first compliance portion 51 be set to be higher. However, a higher compliance performance means that the compliance portion itself vibrates strongly to absorb vibration (this vibration is referred to as "following vibration").

Hence, while the first compliance portion 51 is performing a following vibration to absorb a vibration resulting from an ejection, a subsequent ejection may be performed. Thus, the following vibration can affect the ejection and adversely affect the ejection characteristics. Thus, in the first embodiment described above, the compliance performance of the first compliance portion 51 is intentionally set to be lower than that of the second compliance portion 52, and the second compliance portion 52 which is farther from the piezoelectric elements 20 and in which following vibration is less likely to occur is added. This strategy makes it possible to achieve both absorption of vibration at ejection and mitigation of a deterioration in the characteristics during continuous ejection.

Figure 7:
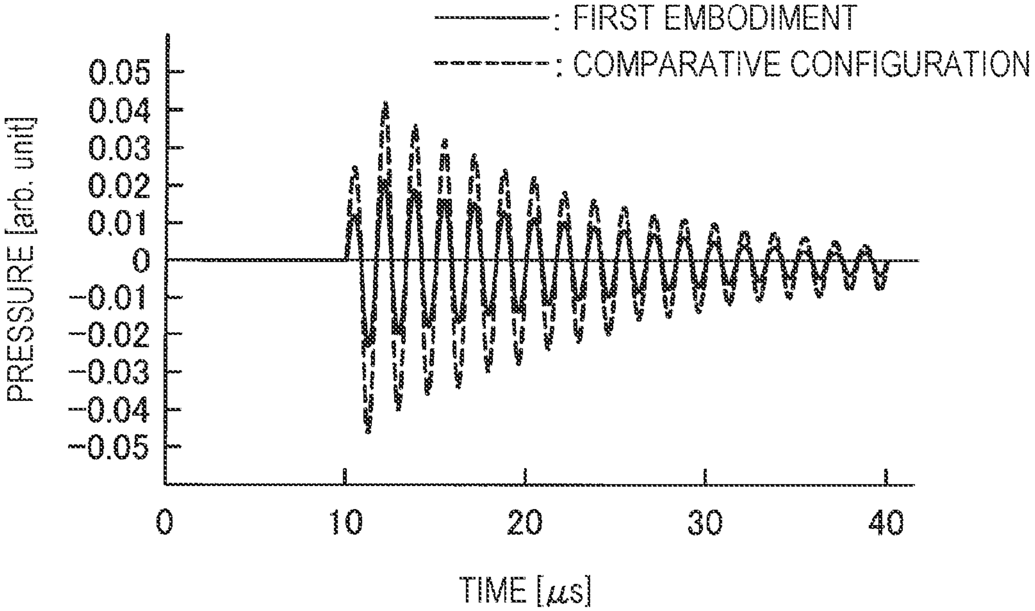
FIG. 7 is a graph for explaining an effect of pressure absorption in the liquid ejecting head of the first embodiment.

FIG. 7 is a graph for explaining an effect of pressure absorption in the liquid ejecting head 10 of the first embodiment described above. In FIG. 7, a result of the first embodiment is depicted with a solid line, and a result of a comparative configuration is depicted with a dashed line. FIG. 7 illustrates calculation results of the pressure at a position immediately downstream of a flow restrictor provided at the boundary between the supply-side common flow path 41 and an individual flow path 42 by expressing pressure absorption as an equivalent circuit model. The comparative configuration has a compliance portion at only the bottom surface of the supply-side common flow path 41. As illustrated in FIG. 7, the pressure values of the liquid ejecting head 10 of the first embodiment described above are smaller as a whole than those of the comparative configuration, illustrating that the effect of pressure absorption is further improved.

In addition, the first embodiment described above has the overlapping portion 11 and the second overlapping portion 14. For example, if the overlapping portion 11 and the second overlapping portion 14 are not formed, and the upper and lower compliance portions are located at positions such that they do not overlap as viewed in the Z-axis direction, the size in the X-axis direction (the lateral direction) would be larger. Hence, the upper and lower compliance portions are located so as to at least partially overlap as viewed in the Z-axis direction in the first embodiment described above, which mitigates a size increase in the X-axis direction (the lateral direction). In other words, the liquid ejecting head 10 in the first embodiment described above is excellent in terms of both mitigation of a size increase and vibration absorption.

In addition, the overlapping portion 11 and the overlapping portion 14 make it possible to suitably absorb vibration. For example, if the first compliance portion 51 is provided but the second compliance portion 52 is not provided in the coupling area A1, the Z1 side facing the first compliance portion 51 does not bend. In this case, even though the first compliance portion 51 bends on the Z2 side and absorbs some pressure, the same effect does not occur on the Z1 side. Thus, there is a possibility that vibration cannot be absorbed effectively as the entire coupling area A1. Since the first embodiment has compliance portions on both the Z1 side and the Z2 side of the coupling area A1, it is possible to suitably absorb vibration.

In other words, the liquid ejecting head 10 in the first embodiment described above is excellent in terms of both mitigation of a size increase and vibration absorption.

In the first embodiment described above, the width W4 of the second overlapping portion 14 in the X-axis direction is smaller than the width W3 of the overlapping portion 11 in the X-axis direction. Since vibration is damped in both the upper and lower portions in the overlapping portion 11, the damping effect is larger than when a compliance portion is provided in only one of the upper and lower portions. Hence, the overlapping portion 11 on the supply side is set to be larger than on the discharge side, which makes it possible to further increase the damping effect.

Since liquid having a relatively low pressure after ejection from the nozzles N flows on the discharge side, the necessity for damping effects is not as strong as on the supply side. Conversely, a compliance portion greater than necessary leads to undesired vibration of flow-path wall surfaces, which can obstruct liquid flow in the flow path, causing an undesirable situation. To solve this issue and obtain a preferred configuration, the width W4 of the second overlapping portion 14 in the X-axis direction is set to be smaller than the width W3 of the overlapping portion 11 in the X-axis direction. In addition, by also setting the compliance performance of the third compliance portion 53 to be lower than the compliance performance of the first compliance portion 51, it is possible to mitigate an unnecessary increase in size.

In the first embodiment described above, the first compliance portion 51 and the third compliance portion 53 can be formed by a known method, such as etching or the like using a photoresist for masking. For example, when the members composing the actuators including the piezoelectric elements 20 in the first recess 75 are formed, the members composing the first compliance portion 51 and the third compliance portion 53 can be formed by a method the same as or similar to the method by which the members composing the actuators are formed. Thus, it is possible to easily form the first compliance portion 51 and the third compliance portion 53 by using the members composing the actuators. By forming the members composing the first compliance portion 51 and the third compliance portion 53 and the members composing the actuators by the same or a similar manufacturing method, it is possible to further simplify the manufacturing process of the liquid ejecting head 10.

B. Second Embodiment

Next, a second embodiment of the present disclosure will be described with reference to FIG. 8. Note that the components substantially the same as those in the foregoing first embodiment are denoted by the same or similar symbols, and description thereof is omitted. A liquid ejecting head 10 of the second embodiment is different from the liquid ejecting head 10 of the foregoing first embodiment in that the first compliance portion 51 is divided into two or more portions aligned in the Y-axis direction (two in the present embodiment).

Figure 8:
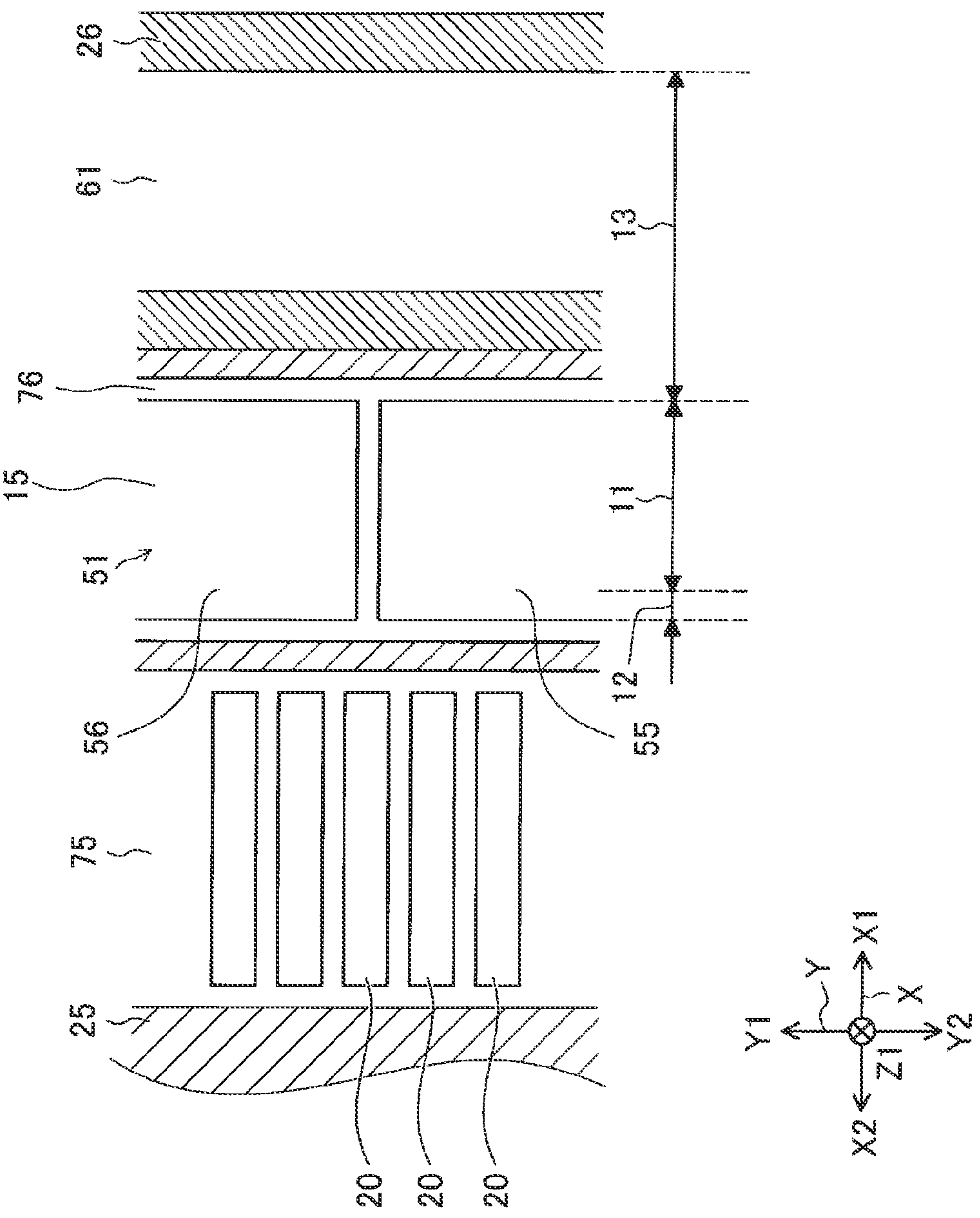
FIG. 8 is a cross-sectional view of a liquid ejecting head in a second embodiment of the present disclosure.

FIG. 8 is a schematic plan view of pressure chambers C of the liquid ejecting head 10 and part of the supply side in the second embodiment. As illustrated in FIG. 8, the first compliance portion 51 has two separate compliance portions 55 and 56 formed by two separate vibration plates aligned in the Y-axis direction, unlike the foregoing first embodiment having a single configuration in which a single vibration plate 24 covers the entire surface across the width of the supply-side common flow path 41 in the Y-axis direction.

This configuration also provides advantageous effects the same as or similar to those of the foregoing first embodiment. In addition, it is easier to attach the vibration plates 24 to the pressure chamber substrate 23 with an adhesive than when the vibration plate 24 is one continuous member. This configuration improves adhesion and holding forces at the positions, and since the sizes of the vibration plates are small, the amount of bending in the vibration plates 24 is small, making the vibration plates 24 less likely to damage.

Since the second compliance portion 52 and the fourth compliance portion 54 are away from the piezoelectric elements 20 and do not receive a strong vibration, the second compliance portion 52 and the fourth compliance portion 54 do not need adhesion and holding forces that much. On the contrary, since the compliance performances of the second compliance portion 52 and the fourth compliance portion 54 should be higher as described above, it is preferable that the second compliance portion 52 and the fourth compliance portion 54 not be divided. In addition, since the second compliance portion 52 and the fourth compliance portion 54 are formed of a material hard to damage, there is little need to divide the second compliance portion 52 and the fourth compliance portion 54 to make them hard to damage, and it is more preferable to set their compliance performance high without dividing them.

C. Other Embodiments (C1) Although the liquid ejecting apparatus 1 in the foregoing embodiments employs a circulation head in which the liquid that flows into the liquid ejecting head 10 circulates, the liquid ejecting apparatus 1 may employ a non-circulating head in which liquid does not circulate. Since a non-circulating head does not include the discharge-side common flow path 43, a configuration not including the third compliance portion 53 and the fourth compliance portion 54 and including the first compliance portion 51 and the second compliance portion 52 on the supply-side common flow path 41 is possible.

(C2) Although the liquid ejecting apparatus 1 of the foregoing embodiments has the compliance portions 51 to 54 on the supply side and the discharge side, the liquid ejecting apparatus 1 may have compliance portions facing in the Z direction on only one of the supply side and the discharge side.

(C3) Although the compliance performance of the fourth compliance portion 54 is higher than the compliance performance of the third compliance portion 53 in the liquid ejecting apparatus 1 of the foregoing embodiments, this relationship is dispensable. In addition, the compliance performance of the second compliance portion 52 may be lower than the compliance performance of the fourth compliance portion 54, and the compliance performance of the first compliance portion 51 may be higher than the compliance performance of the second compliance portion 52.

(C4) Although each of the first compliance portion 51 and the third compliance portion 53 includes the vibration plate 24, the first electrode, the piezoelectric material, and the second electrode in the liquid ejecting apparatus 1 of the foregoing embodiments, a configuration including only the vibration plate 24 is possible, or a configuration without one of the first electrode and the second electrode is also possible. In addition, a configuration in which the first compliance portion 51 and the third compliance portion 53 are formed of resin films is also possible as with the second compliance portion 52 and the fourth compliance portion 54.

(C5) Although the width of the first compliance portion 51 in the Y-axis direction and the width of the second compliance portion 52 in the Y-axis direction are substantially the same in the liquid ejecting apparatus 1 of the foregoing first embodiment, the width of the second compliance portion 52 in the Y-axis direction may be longer than the width of the first compliance portion 51 in the Y-axis direction.

(C6) In the liquid ejecting apparatus 1 of the foregoing embodiments, a configuration without the first non-overlapping portion 12 and the second non-overlapping portion 13 is possible. In other words, the first compliance portion 51 and the second compliance portion 52 may perfectly overlap each other as viewed in the Z-axis direction. Similarly, the second compliance portion 52 and the fourth compliance portion 54 may perfectly overlap each other as viewed in the Z-axis direction.

(C7) Although the width W2 of the second overlapping portion 14 in the X-axis direction is smaller than the width W1 of the overlapping portion 11 in the X-axis direction in the liquid ejecting apparatus 1 of the foregoing embodiments, the width W2 of the second overlapping portion 14 in the X-axis direction may be larger or equal to the width W1 of the overlapping portion 11 in the X-axis direction.

The present disclosure is not limited to the foregoing embodiments and can be implemented in various configurations within a scope not departing from the spirit of present disclosure. For example, the technical features in the embodiments corresponding to the technical features in the aspects described in the summary of the disclosure can be replaced or combined as appropriate to solve some or all of the foregoing problems or to achieve some or all of the foregoing advantageous effects. In addition, unless technical features are described as essential ones in the present specification, they can be omitted as appropriate.

(1) One aspect of the present disclosure provides a liquid ejecting head. The liquid ejecting head includes: a plurality of individual flow paths arranged in a first direction, each individual flow path including a nozzle and a pressure chamber to which a pressure for ejecting liquid through the nozzle is applied; a common flow path communicating in common with the plurality of individual flow paths; piezoelectric elements each located on a first side of the corresponding pressure chamber and configured to apply a pressure to liquid in the pressure chamber to eject liquid through the nozzle, the first side being one side in a second direction intersecting the first direction; a first compliance portion provided at least at a position on the first side of a coupling area in the common flow path where the common flow path is coupled to the plurality of individual flow paths; and a second compliance portion, different from the first compliance portion, provided at least at a position on a second side of the coupling area in the common flow path, the second side being the other side in the second direction and being opposite to the first side, and the first compliance portion and the second compliance portion have an overlapping portion where the first compliance portion and the second compliance portion partially overlap each other as viewed in the second direction. In this aspect, in the coupling area in the common flow path where the common flow path is coupled to the plurality of individual flow paths, the first compliance portion and the second compliance portion are provided such that the first compliance portion and the second compliance portion partially overlap each other as viewed in the second direction. This configuration enables sufficient vibration absorption and mitigates an increase in the size of the liquid ejecting head.

(2) In the liquid ejecting head of the above aspect, compliance performance of the second compliance portion may be higher than compliance performance of the first compliance portion. In this configuration, since the compliance performance of the second compliance portion is higher than the compliance performance of the first compliance portion, the second compliance portion effectively absorbs vibration of liquid.

(3) In the liquid ejecting head of the above aspect, Young's modulus of the second compliance portion may be smaller than Young's modulus of the first compliance portion. This configuration enables the compliance performance of the second compliance portion to be higher than the compliance performance of the first compliance portion.

(4) In the liquid ejecting head of the above aspect, a thickness of the second compliance portion in the second direction may be smaller than a thickness of the first compliance portion in the second direction. This configuration enables the compliance performance of the second compliance portion to be higher than the compliance performance of the first compliance portion.

(5) In the liquid ejecting head of the above aspect, a width of the second compliance portion in a third direction intersecting the first direction and the second direction may be larger than a width of the first compliance portion in the third direction. This configuration enables the compliance performance of the second compliance portion to be higher than the compliance performance of the first compliance portion.

(6) In the liquid ejecting head of the above aspect, a width of the second compliance portion in the first direction may be larger than a width of the first compliance portion in the first direction. This configuration enables the compliance performance of the second compliance portion to be higher than the compliance performance of the first compliance portion.

(7) In the liquid ejecting head of the above aspect, the first compliance portion may be divided into two or more portions aligned in the first direction. This configuration improves the adhesion of the first compliance portion and the holding force in the liquid ejecting head.

(8) In the liquid ejecting head of the above aspect, a configuration in which the second compliance portion is not divided into two or more portions aligned in the first direction is possible. In this configuration, it is easy to form the members of the second compliance portion, and the compliance performance is high.

(9) In the liquid ejecting head of the above aspect, a distance between the pressure chambers and the first compliance portion in the second direction may be shorter than a distance between the pressure chambers and the second compliance portion in the second direction. The configuration in which the distance from the pressure chambers to the first compliance portion is shorter than to the second compliance portion is possible.

(10) In the liquid ejecting head of the above aspect, the first compliance portion may further have a first non-overlapping portion where the first compliance portion does not overlap the second compliance portion as viewed in the second direction, and the second compliance portion may further have a second non-overlapping portion where the second compliance portion does not overlap the first compliance portion as viewed in the second direction.

(11) In the liquid ejecting head of the above aspect, an area of the first non-overlapping portion viewed in the second direction may be smaller than an area of the second non-overlapping portion viewed in the second direction.

(12) In the liquid ejecting head of the above aspect, the common flow path may include a supply-side common flow path configured to supply liquid to the plurality of individual flow paths and a discharge-side common flow path configured to discharge liquid from the plurality of individual flow paths, the first compliance portion and the second compliance portion may be located on the supply-side common flow path, the liquid ejecting head may further include: a third compliance portion provided at least at a position on the first side of a second coupling area in the discharge-side common flow path where the discharge-side common flow path is coupled to the plurality of individual flow paths; and a fourth compliance portion, different from the third compliance portion, provided at least at a position on the second side of the second coupling area in the discharge-side common flow path, and the third compliance portion and the fourth compliance portion may have a second overlapping portion where the third compliance portion and the fourth compliance portion partially overlap each other as viewed in the second direction.

(13) In the liquid ejecting head of the above aspect, compliance performance of the third compliance portion may be lower than compliance performance of the first compliance portion. With this configuration, since the compliance performance of the third compliance portion, which is away from the pressure chamber and which is on the discharge side where the compliance performance can be lower than on the supply side, is lower than the compliance performance of the first compliance portion on the supply side, it is possible to mitigate a size increase that occurs due to provision of the compliance portion on the discharge side.

(14) In the liquid ejecting head of the above aspect, compliance performance of the fourth compliance portion may be lower than compliance performance of the second compliance portion. With this configuration, since the compliance performance of the fourth compliance portion, which is away from the pressure chamber and which is on the discharge side where the compliance performance can be lower than on the supply side, is lower than the compliance performance of the second compliance portion on the supply side, it is possible to mitigate a size increase that occurs due to provision of the compliance portion on the discharge side.

(15) In the liquid ejecting head of the above aspect, a width of the second overlapping portion in a third direction intersecting the first direction and the second direction may be smaller than a width of the overlapping portion in the third direction. In this configuration, since the width in the third direction of the second overlapping portion on the discharge side is smaller than the width in the third direction of the overlapping portion on the supply side, it is possible to mitigate a size increase that occurs due to provision of the compliance portion on the discharge side.

(16) Another aspect of the present disclosure provides a liquid ejecting apparatus. The liquid ejecting apparatus includes: the liquid ejecting head according to the foregoing one aspect; and a controller configured to control ejection operation of ejecting liquid from the liquid ejecting head. This configuration enables sufficient vibration absorption and mitigates an increase in the size of the liquid ejecting head.

The present disclosure can be applied not only to ink jet liquid ejecting apparatuses but also to any liquid ejecting apparatuses that eject liquid other than ink. For example, the present disclosure is applicable to the following various kinds of liquid ejecting apparatuses.

(1) Image printing apparatuses such as fax machines.
(2) Coloring-material ejecting apparatuses used for manufacturing color filters for image display apparatuses such as liquid crystal displays.
(3) Electrode-material ejecting apparatuses used for forming electrodes of organic electro luminescence (EL) displays, field emission displays (FEDs), and the like.
(4) Liquid ejecting apparatuses that eject a liquid containing bio-organic matter used for manufacturing biochips.
(5) Specimen ejecting apparatuses used as precision pipettes.
(6) Lubricating-oil ejecting apparatuses.
(7) Resin-liquid ejecting apparatuses.
(8) Liquid ejecting apparatuses that eject lubricating oil to precision machines such as watches and cameras in a pinpoint manner.
(9) Liquid ejecting apparatus that eject a transparent resin liquid such as a UV curable resin liquid onto a substrate to form micro hemispherical lenses (optical lenses) or the like used in optical communication devices.
(10) Liquid ejecting apparatuses that eject an acidic or alkaline etchant to etch a substrate or the like.
(11) Liquid ejecting apparatuses including a liquid consuming head that ejects droplets including a small amount of liquid of any other kinds.

Note that "droplets" denotes a state of liquid ejected from a liquid ejecting apparatus and include ones with shapes leaving tails having granular shapes, tear-like shapes, and thread-like shapes. Here, "liquid" denotes any material that can be consumed by a liquid ejecting apparatus. For example, "liquid" may refer to a material in a state in which the substances are in a liquid phase and includes materials in the liquid state having a high or low viscosity; sol; gel water; and other materials in a liquid state such as inorganic solvents, organic solvents, solutions, liquid resins, and liquid metals (metal melt). The term "liquid" includes not only liquid as one state of a substance but also solvents in which particles of functional materials composed of solid substances, such as pigments and metal particles, are dissolved, dispersed, or mixed, for example. Typical examples of combinations of a first liquid and a second liquid include the following, in addition to the combination of ink and a reaction liquid described in the above embodiments.

(1) A main agent and a curing agent in an adhesive
(2) A base paint and a diluent for a paint, and a clear paint and a diluent
(3) A main solvent containing cells and a dilution solvent for ink for cells
(4) A metallic leaf pigment dispersion and a dilution solvent for ink (metallic ink) that exhibits metallic luster
(5) Gasoline, light oil, and biofuel for vehicle fuel
(6) Base components and protective components for medicines
(7) Phosphors and encapsulants for light-emitting diodes (LEDs)

In addition, the present disclosure can be implemented, in addition to the aspects as the foregoing liquid ejecting head and liquid ejecting apparatus, in various aspects such as a liquid ejecting system and a multifunction printer including a liquid ejecting apparatus.

What is claimed is:

1. A liquid ejecting head comprising:

a plurality of individual flow paths arranged in a first direction, each individual flow path including a nozzle and a pressure chamber to which a pressure for ejecting liquid through the nozzle is applied;

a common flow path communicating in common with the plurality of individual flow paths;

piezoelectric elements each located on a first side of the corresponding pressure chamber and configured to apply a pressure to liquid in the pressure chamber to eject liquid through the nozzle, the first side being one side in a second direction intersecting the first direction;

a first compliance portion provided at least at a position on the first side of a coupling area in the common flow path where the common flow path is coupled to the plurality of individual flow paths; and a second compliance portion, different from the first compliance portion, provided at least at a position on a second side of the coupling area in the common flow path, the second side being the other side in the second direction and being opposite to the first side, wherein the first compliance portion and the second compliance portion have an overlapping portion where the first compliance portion and the second compliance portion partially overlap each other as viewed in the second direction, the first compliance portion further has a first non-overlapping portion where the first compliance portion does not overlap the second compliance portion as viewed in the second direction, and the second compliance portion further has a second non-overlapping portion where the second compliance portion does not overlap the first compliance portion as viewed in the second direction.

2. The liquid ejecting head according to claim 1, wherein compliance performance of the second compliance portion is higher than compliance performance of the first compliance portion.

3. The liquid ejecting head according to claim 1, wherein Young's modulus of the second compliance portion is smaller than Young's modulus of the first compliance portion.

4. The liquid ejecting head according to claim 1, wherein a thickness of the second compliance portion in the second direction is smaller than a thickness of the first compliance portion in the second direction.

5. The liquid ejecting head according to claim 1, wherein a width of the second compliance portion in a third direction intersecting the first direction and the second direction is larger than a width of the first compliance portion in the third direction.

6. The liquid ejecting head according to claim 1, wherein a width of the second compliance portion in the first direction is larger than a width of the first compliance portion in the first direction.

7. The liquid ejecting head according to claim 1, wherein the first compliance portion is divided into two or more portions aligned in the first direction.

8. The liquid ejecting head according to claim 7, wherein the second compliance portion is not divided into two or more portions aligned in the first direction.

9. The liquid ejecting head according to claim 1, wherein a distance between the pressure chambers and the first compliance portion in the second direction is shorter than a distance between the pressure chambers and the second compliance portion in the second direction.

10. The liquid ejecting head according to claim 1, wherein an area of the first non-overlapping portion viewed in the second direction is smaller than an area of the second non-overlapping portion viewed in the second direction.

11. The liquid ejecting head according to claim 1, wherein the common flow path includes:

a supply-side common flow path configured to supply liquid to the plurality of individual flow paths; and a discharge-side common flow path configured to discharge liquid from the plurality of individual flow paths, the first compliance portion and the second compliance portion are located on the supply-side common flow path, the liquid ejecting head further comprises:

a third compliance portion provided at least at a position on the first side of a second coupling area in the discharge-side common flow path where the discharge-side common flow path is coupled to the plurality of individual flow paths; and a fourth compliance portion, different from the third compliance portion, provided at least at a position on the second side of the second coupling area in the discharge-side common flow path, and the third compliance portion and the fourth compliance portion have a second overlapping portion where the third compliance portion and the fourth compliance portion partially overlap each other as viewed in the second direction.

12. The liquid ejecting head according to claim 11, wherein compliance performance of the third compliance portion is lower than compliance performance of the first compliance portion.

13. The liquid ejecting head according to claim 11, wherein compliance performance of the fourth compliance portion is lower than compliance performance of the second compliance portion.

14. The liquid ejecting head according to claim 11, wherein a width of the second overlapping portion in a third direction intersecting the first direction and the second direction is smaller than a width of the overlapping portion in the third direction.

15. A liquid ejecting apparatus comprising:

the liquid ejecting head according to claim 1; and a controller configured to control ejection operation of ejecting liquid from the liquid ejecting head.

16. A liquid ejecting head comprising:

a plurality of individual flow paths arranged in a first direction, each individual flow path including a nozzle and a pressure chamber to which a pressure for ejecting liquid through the nozzle is applied;

a common flow path communicating in common with the plurality of individual flow paths;

piezoelectric elements each located on a first side of the corresponding pressure chamber and configured to apply a pressure to liquid in the pressure chamber to eject liquid through the nozzle, the first side being one side in a second direction intersecting the first direction;

a first compliance portion provided at least at a position on the first side of a coupling area in the common flow path where the common flow path is coupled to the plurality of individual flow paths; and a second compliance portion, different from the first compliance portion, provided at least at a position on a second side of the coupling area in the common flow path, the second side being the other side in the second direction and being opposite to the first side, wherein the first compliance portion and the second compliance portion have an overlapping portion where the first compliance portion and the second compliance portion partially overlap each other as viewed in the second direction, the common flow path includes:

a supply-side common flow path configured to supply liquid to the plurality of individual flow paths; and a discharge-side common flow path configured to discharge liquid from the plurality of individual flow paths, the first compliance portion and the second compliance portion are located on the supply-side common flow path, the liquid ejecting head further comprises:

a third compliance portion provided at least at a position on the first side of a second coupling area in the discharge-side common flow path where the discharge-side common flow path is coupled to the plurality of individual flow paths; and a fourth compliance portion, different from the third compliance portion, provided at least at a position on the second side of the second coupling area in the discharge-side common flow path, and the third compliance portion and the fourth compliance portion have a second overlapping portion where the third compliance portion and the fourth compliance portion partially overlap each other as viewed in the second direction.

17. The liquid ejecting head according to claim 16, wherein compliance performance of the third compliance portion is lower than compliance performance of the first compliance portion.

18. The liquid ejecting head according to claim 16, wherein compliance performance of the fourth compliance portion is lower than compliance performance of the second compliance portion.

19. The liquid ejecting head according to claim 16, wherein a width of the second overlapping portion in a third direction intersecting the first direction and the second direction is smaller than a width of the overlapping portion in the third direction.

20. A liquid ejecting head comprising:

a plurality of individual flow paths arranged in a first direction, each individual flow path including a nozzle and a pressure chamber to which a pressure for ejecting liquid through the nozzle is applied;

a common flow path communicating in common with the plurality of individual flow paths;

piezoelectric elements each located on a first side of the corresponding pressure chamber and configured to apply a pressure to liquid in the pressure chamber to eject liquid through the nozzle, the first side being one side in a second direction intersecting the first direction;

a first compliance portion provided at least at a position on the first side of a coupling area in the common flow path where the common flow path is coupled to the plurality of individual flow paths; and a second compliance portion, different from the first compliance portion, provided at least at a position on a second side of the coupling area in the common flow path, the second side being the other side in the second direction and being opposite to the first side, wherein the first compliance portion and the second compliance portion have an overlapping portion where the first compliance portion and the second compliance portion partially overlap each other as viewed in the second direction, and the first compliance portion is divided into two or more portions aligned in the first direction.

* * * * *